(12) United States Patent
Srinivasan et al.

(10) Patent No.: US 11,586,611 B2
(45) Date of Patent: Feb. 21, 2023

(54) APPROACHES FOR VALIDATING DATA

(71) Applicant: Palantir Technologies Inc., Palo Alto, CA (US)

(72) Inventors: Aditya Srinivasan, New York, NY (US); Tim Overeem, New York, NY (US)

(73) Assignee: Palantir Technologies Inc., Palo Alto, CA (US)

( * ) Notice: Subject to any disclaimer, the term of this patent is extended or adjusted under 35 U.S.C. 154(b) by 0 days.

(21) Appl. No.: 17/229,824

(22) Filed: Apr. 13, 2021

(65) Prior Publication Data

US 2021/0232565 A1    Jul. 29, 2021

Related U.S. Application Data

(63) Continuation of application No. 16/138,751, filed on Sep. 21, 2018, now Pat. No. 10,977,240.

(60) Provisional application No. 62/571,430, filed on Oct. 12, 2017.

(51) Int. Cl.
*G06F 16/23* (2019.01)
*G06F 16/901* (2019.01)

(52) U.S. Cl.
CPC ...... *G06F 16/2365* (2019.01); *G06F 16/9024* (2019.01)

(58) Field of Classification Search
CPC .................. G06F 16/2365; G06F 16/9024
USPC ........................................................ 707/690
See application file for complete search history.

(56) References Cited

U.S. PATENT DOCUMENTS

| | | |
|---|---|---|
| 6,865,567 B1 | 3/2005 | Oommen |
| 7,565,337 B2 | 7/2009 | Huelsman et al. |
| 7,653,665 B1 * | 1/2010 | Stefani ............... G06F 16/2343 709/203 |
| 8,725,775 B2 | 5/2014 | Gong |
| 9,430,548 B1 | 8/2016 | Jayakumar |
| 9,563,450 B1 | 2/2017 | Totale |
| 2002/0087744 A1 | 7/2002 | Kitchin |
| 2005/0132350 A1 | 6/2005 | Markley |
| 2006/0155703 A1 * | 7/2006 | Dejean .................. G06F 40/258 |
| 2007/0028079 A1 * | 2/2007 | Weinberg .................. G06F 8/34 712/234 |
| 2007/0196015 A1 * | 8/2007 | Meunier ............... G06F 40/258 707/999.1 |
| 2008/0140602 A1 | 6/2008 | Roth |
| 2010/0023486 A1 | 1/2010 | Baras |
| 2010/0145946 A1 | 6/2010 | Conrad |

(Continued)

FOREIGN PATENT DOCUMENTS

CN    105677874 B  * 11/2018   ........... G06F 16/212

*Primary Examiner* — Giovanna B Colan
(74) *Attorney, Agent, or Firm* — Sheppard Mullin Richter & Hampton LLP

(57) ABSTRACT

Systems and methods are provided for determining a request to validate data, the request specifying validation criteria; generating a graph for validating the data, the graph including at least one node-based connected component that evaluates the data, the node-based connected component being constructed to represent the validation criteria; validating the data using the generated graph, wherein the data being validated is evaluated by the node-based connected component; and providing information describing the validated data.

20 Claims, 9 Drawing Sheets

(56) References Cited

U.S. PATENT DOCUMENTS

| | | | |
|---|---|---|---|
| 2011/0022575 A1* | 1/2011 | Tomkins | G06F 8/20 |
| | | | 707/E17.005 |
| 2013/0268508 A1 | 10/2013 | Bracher | |
| 2014/0214838 A1* | 7/2014 | Hendrey | G06F 16/319 |
| | | | 707/737 |
| 2015/0220657 A1 | 8/2015 | Colgrave | |
| 2016/0070733 A1* | 3/2016 | Gould | G06F 40/18 |
| | | | 707/700 |
| 2017/0270111 A1 | 9/2017 | Angelini | |
| 2018/0181608 A1* | 6/2018 | Wu | G06F 16/2423 |

\* cited by examiner

US 11,586,611 B2

APPROACHES FOR VALIDATING DATA

CROSS REFERENCE TO RELATED APPLICATIONS

This application is a continuation of U.S. application Ser. No. 16/138,751, filed Sep. 21, 2018, which claims the benefit under 35 U.S.C. § 119(e) of U.S. Provisional Application Ser. No. 62/571,430 filed Oct. 12, 2017, the contents of which is incorporated by reference in its entirety into the present disclosure.

FIELD OF THE INVENTION

This disclosure relates to approaches for validating data.

BACKGROUND

Under conventional approaches, various types of data can be validated for myriad purposes. The data validation process typically involves applying validation rules to data. These validation rules can be used to ensure the data complies with various requirements. For example, data may be validated to ensure the data corresponds to an expected data type. Often, conventional approaches may not provide the features needed to sufficiently validate data. For example, conventional approaches may not be able to validate data using complex validation expressions. In another example, conventional approaches may not support nested validation of data.

SUMMARY

Various embodiments of the present disclosure can include systems, methods, and non-transitory computer readable media configured to determine a request to validate data, the request specifying validation criteria; generate a graph for validating the data, the graph including at least one node-based connected component that evaluates the data, the node-based connected component being constructed to represent the validation criteria; validate the data using the generated graph, wherein the data being validated is evaluated by the node-based connected component; and provide information describing the validated data.

In some embodiments, the node-based connected component includes at least one source node, and wherein the data being validated is provided as input to the source node.

In some embodiments, the node-based connected component includes at least one sink node, and wherein data satisfying the validation criteria is determined by the sink node.

In some embodiments, the node-based connected component is constructed to represent at least one Boolean operation.

In some embodiments, the systems, methods, and non-transitory computer readable media are configured to provide the data to a first node corresponding to the node-based connected component for processing, the first node being a source node; determine at least a first portion of the data that satisfies the first node; provide the portion of the data that satisfies the first node to a second node corresponding to the node-based connected component, the second node being a sink node; determine at least a second portion of the first portion of the data that satisfies the second node; and determine the second portion of the data satisfies the validation criteria.

In some embodiments, the first node is associated with a first validation expression with which the data is validated.

In some embodiments, the second node is associated with a second validation expression with which the first portion of the data is validated.

In some embodiments, the data corresponds to a set of rows in a database table.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

DETAILED DESCRIPTION

Figure 1:
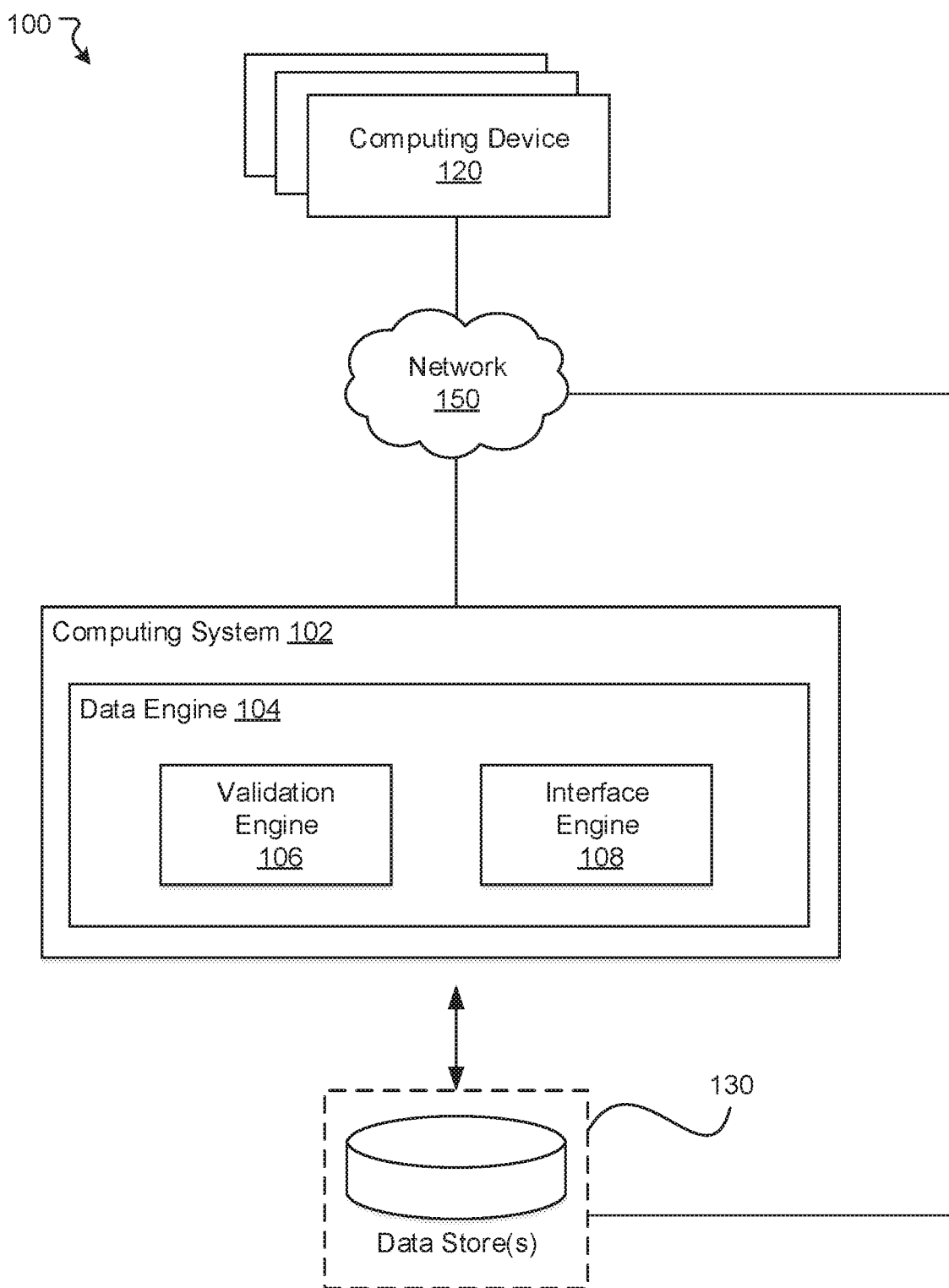
FIG. 1 illustrates an example computing environment, in accordance with various embodiments.

Under conventional approaches, various types of data can be validated for myriad purposes. The data validation process typically involves applying validation rules to data. These validation rules can be used to ensure the data complies with various requirements. For example, data may be validated to ensure the data corresponds to an expected data type. Often, conventional approaches may not provide the features needed to sufficiently validate data. For example, conventional approaches may not be able to validate data using complex validation expressions. In another example, conventional approaches may not support nested validation of data.

A claimed solution rooted in computer technology overcomes problems specifically arising in the realm of computer technology. In various embodiments, a graph-based evaluation framework can be constructed to validate data based on various validation criteria (e.g., validation expressions). In some embodiments, the graph-based evaluation framework corresponds to a node graph that has been generated to validate a data set based on specified validation criteria. The graph can include one or more connected components that are each made up of one or more nodes. In some embodiments, each node in a connected component can be associated with some portion (or aspect) of the validation criteria. For example, in some embodiments, each node can be associated with a corresponding validation expression for evaluating the data set. Further, each connected component can include at least one source node and at least one sink node. In some embodiments, a source node refers to an initial node of a graph that has no incoming edges. In some embodiments, a sink node refers to a terminating node of a graph that has no outgoing edges.

For example, a data set being validated (e.g., rows of a database table) can be provided in its entirety to a source node of a connected component for validation. In this example, the source node can validate the data set used a validation expression associated with the source node. Any portion of the data set (e.g., rows of a database table) that satisfies this validation expression can be provided for further validation to neighboring nodes that are connected to the source node through corresponding edges. This processing continues until a sink node is reached. Any portion of the data set that satisfies validation criteria associated with a sink node in the connected component is deemed to be validated. For example, a graph may be constructed to validate rows in a database table. In this example, the graph can be configured to ensure that rows for which a "parent" column value is set to "true" also have a numerical value corresponding to a "number of children" column that is greater than zero. In this example, the rows of the database table can be provided as input to a source node of a connected component included in the graph. The source node can be constructed to validate rows that have a "parent" column value set to true. Any rows satisfying this criterion are passed onto a successor node in the graph. Here, the successor node can be constructed to ensure that all incoming rows (i.e., rows provided by the source node) have a corresponding "number of children" column value that is greater than zero. In this example, the successor node acts as a sink node which identifies all rows that both have a "parent" column value set to true and a "number of children" column value greater than zero.

As mentioned, a graph can be constructed using one or more connected components. These connected components can be arranged to represent any number of complex validation expressions with which data will be evaluated. Such complex validation expressions can include various Boolean operations (e.g., AND operations, OR operations, XOR operations, NOT operations, etc.). In various embodiments, graph-based evaluation frameworks can be created through a user interface. For example, a user interacting with the interface can select data (e.g., a database table) to be validated. In some embodiments, a schema for the data can be determined and provided through the interface. In this example, the user can select columns to be validated and specify corresponding validation criteria for those columns. A system can then generate a graph-based evaluation framework that implements the specified validation criteria. In some embodiments, user specified validation criteria can be analyzed to produce an optimal graph-based evaluation framework. For example, the system can generate a truth table corresponding to the user specified validation criteria. This truth table can be minimized using generally known approaches to produce one or more optimal expressions that represent the user specified validation criteria as a graph-based evaluation framework.

FIG. 1 illustrates an example environment 100, in accordance with various embodiments. The example environment 100 can include at least one computing system 102 that includes one or more processors and memory. The processors can be configured to perform various operations by interpreting machine-readable instructions. In some embodiments, the example environment 100 may be implemented as an enterprise data platform. In some embodiments, the example environment 100 may be configured to interact with computing systems of an enterprise data platform. In various embodiments, computing systems of the enterprise data platform may store and manage various data as objects in one or more object graphs. In some embodiments, an object graph may be made up of a number of objects that serve as containers for data. The object graph can also identify various relationships between objects, for example, using edges (or links) that connect objects. Each object can include a number of object components including, for example, a properties component that includes structured pieces of information, a media component that includes binary attachments of data (e.g., text documents, images, videos, etc.), a notes component (e.g., a free text container), and one or more respective links (or edges) that associate the object with other objects in the object graph. In some instances, the object graph can include different types of objects. For example, an object may represent an entity (e.g., person(s), place(s), thing(s), etc.), an activity (e.g., event, incident, etc.), a document, or multimedia, to name some examples. In some embodiments, data corresponding to populated object graphs is stored and accessible through one or more data stores 130.

In some embodiments, the computing system 102 can include an data engine 104. The data engine 104 can include a validation engine 106 and an interface engine 108. The data engine 104 can be executed by the processor(s) of the computing system 102 to perform various operations including those operations described in reference to the validation engine 106 and the interface engine 108. In general, the data engine 104 can be implemented, in whole or in part, as software that is capable of running on one or more computing devices or systems. In one example, the data engine 104 may be implemented as or within a software application running on one or more computing devices (e.g., user or client devices) and/or one or more servers (e.g., network servers or cloud servers). In some instances, various aspects of the data engine 104, the validation engine 106, and the interface engine 108 may be implemented in one or more computing systems and/or devices. The environment 100 may also include one or more data stores 130 accessible to the computing system 102. In general, a data store may be any device in which data can be stored and from which data can be retrieved. The data stores 130 may be accessible to the computing system 102 either directly or over a network 150. In some embodiments, the data stores 130 can store data that can be accessed by the data engine 104 to provide the various features described herein. For example, the data stores 130 can store information corresponding to data to be validated (e.g., raw data, tables, object graph data, etc.), validated expressions with which to validate data, graph-based evaluation frameworks with which data can be validated, and/or respective validation states of nodes in such graph-based evaluation frameworks (e.g., information indicating which portions of a given data set satisfied, or did not satisfy, validation criteria associated with a given node of a graph-based evaluation framework). The network 150 may be any wired or wireless network through which data can be sent and received (e.g., the Internet, local area network, etc.).

The validation engine 106 can be configured to generate graph-based evaluation frameworks for validating data. As mentioned, in some embodiments, a graph-based evaluation framework corresponds to a node graph that has been generated to validate a data set based on specified validation criteria. The graph can include one or more connected components that are each made up of one or more nodes. In some embodiments, each node in a connected component can be associated with some portion (or aspect) of the validation criteria. For example, in some embodiments, each node can be associated with a corresponding validation expression for evaluating the data set. Further, each connected component can include at least one source node and at least one sink node. In some embodiments, a source node refers to an initial node of a graph that has no incoming edges. In some embodiments, a sink node refers to a terminating node of a graph that has no outgoing edges. More details describing the validation engine 106 will be provided below in reference to FIG. 2.

The interface engine 108 can be configured to generate and provide an interface (e.g., graphical user interface) through which various information can be accessed and visualized. For example, the interface can be accessed using a software application (e.g., data validation application, web browser, etc.) running on a computing device 120 and through a display screen of the computing device 120. The interface can provide users with the ability to access data validation information as determined by the validation engine 106. For example, a user operating the computing device 120 can interact with the interface to access information identifying portions of a given data set that validated successfully and those portions that did not validated successfully.

Figure 2:
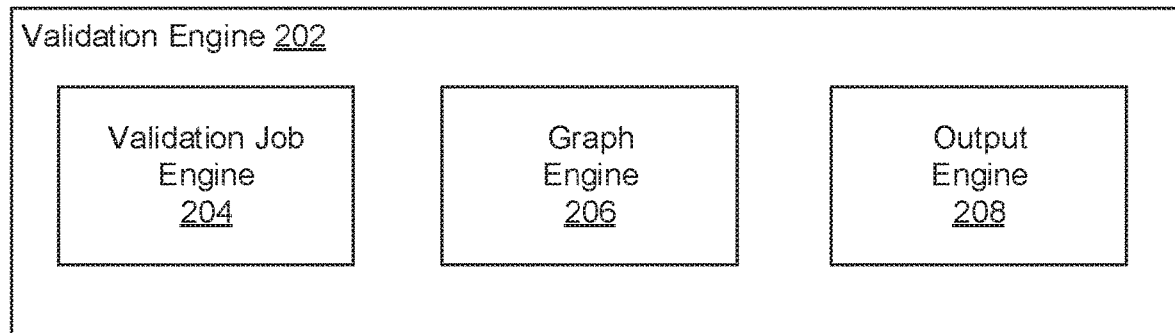
FIG. 2 illustrates an example validation engine, in accordance with various embodiments.

FIG. 2 illustrates an example validation engine 202, in accordance with various embodiments. The validation engine 202 may be implemented as the validation engine 106 of FIG. 1. In some embodiments, the validation engine 202 includes a validation job engine 204, a graph engine 206, and an output engine 208.

The validation job engine 204 can be configured to create validation jobs for various data. In some embodiments, a validation job can specify validation criteria to be applied to various data. When creating a validation job, a user can define various validation criteria to be applied to the data. For example, when validating rows of a database table, the user can specify one or more validation expressions to be used for validating data corresponding to those rows. In general, a validation expression can be created using well-known approaches for validating data. For example, in some embodiments, a validation expression can be created to ensure that rows have a specified value assigned to a given column. In one example, the validation expression can ensure that rows of the database table each have a corresponding "parent" column value set to a specified Boolean value (e.g., "true" or "false"). Other types of validations can involve a comparison between a value of one column of the database table with a value of another column of the database table. Many variations are possible. In some embodiments, validation jobs can be created through a graphical user interface, as described in reference to FIG. 3. In some embodiments, validation jobs can be defined and submitted through an application programming interface (API). For example, validation job parameters (e.g., data to be validated, validation expressions, etc.) can be defined in a JavaScript Object Notation (JSON) document that is submitted through the API. Again, many variations are possible.

The graph engine 206 can be configured to generate a graph-based evaluation framework (or "graph") that represents the specified validation job. As mentioned, in some embodiments, a graph-based evaluation framework corresponds to a node graph that has been generated to validate a data set based on specified validation criteria. The graph can include one or more connected components that are each made up of one or more nodes. In some embodiments, each node in a connected component can be associated with some portion (or aspect) of the validation criteria. In some embodiments, each node can be associated with a corresponding validation expression for evaluating the data set.

Figure 4A:
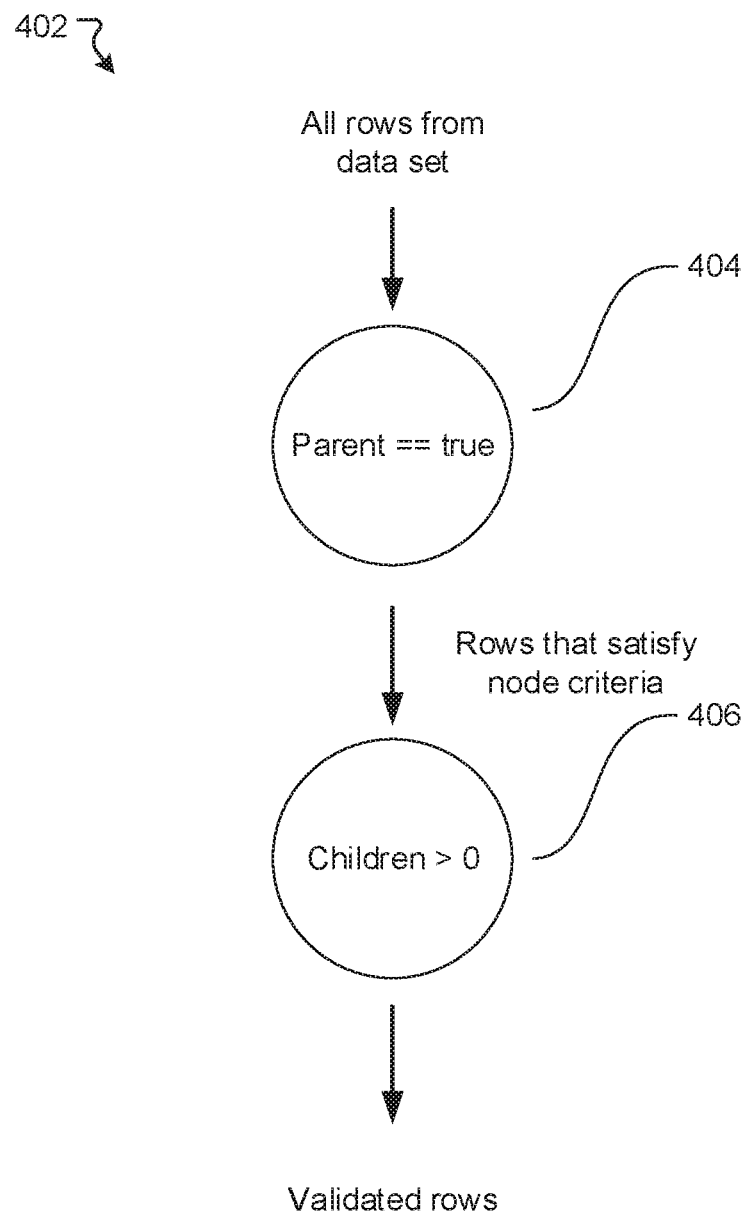
FIGS. 4A-4D illustrate diagrams of example graph-based evaluation frameworks, in accordance with various embodiments

For example, a database table may include a "parent" column that indicates whether an individual is a parent and a "number of children" column that provides a count of the individual's children. In this example, a validation expression can be created to ensure that rows having a corresponding "parent" column value that is set to true (i.e., the individual is a parent) also have a corresponding "number of children" column value that is greater than zero (i.e., number of children is greater than zero). In some embodiments, when abstracting this validation expression as a graph, the graph engine 206 can create a connected component that includes a first node (e.g., a source node) and a second node (e.g., a sink node), as illustrated in the example of FIG. 4A. In this example, the first node can identify rows that have a "parent" column value set to true. Any rows that satisfy this criterion can then be passed to the second node for processing. Any rows that do not satisfy this criterion can be identified as rows that failed the validation job. The second node can be configured to identify rows having a "number of children" column value that is greater than zero. In some embodiments, rows that satisfy this criterion are then deemed validated. In some embodiments, rows that do not satisfy this criterion can be identified as rows that failed the validation job.

Figure 4B:
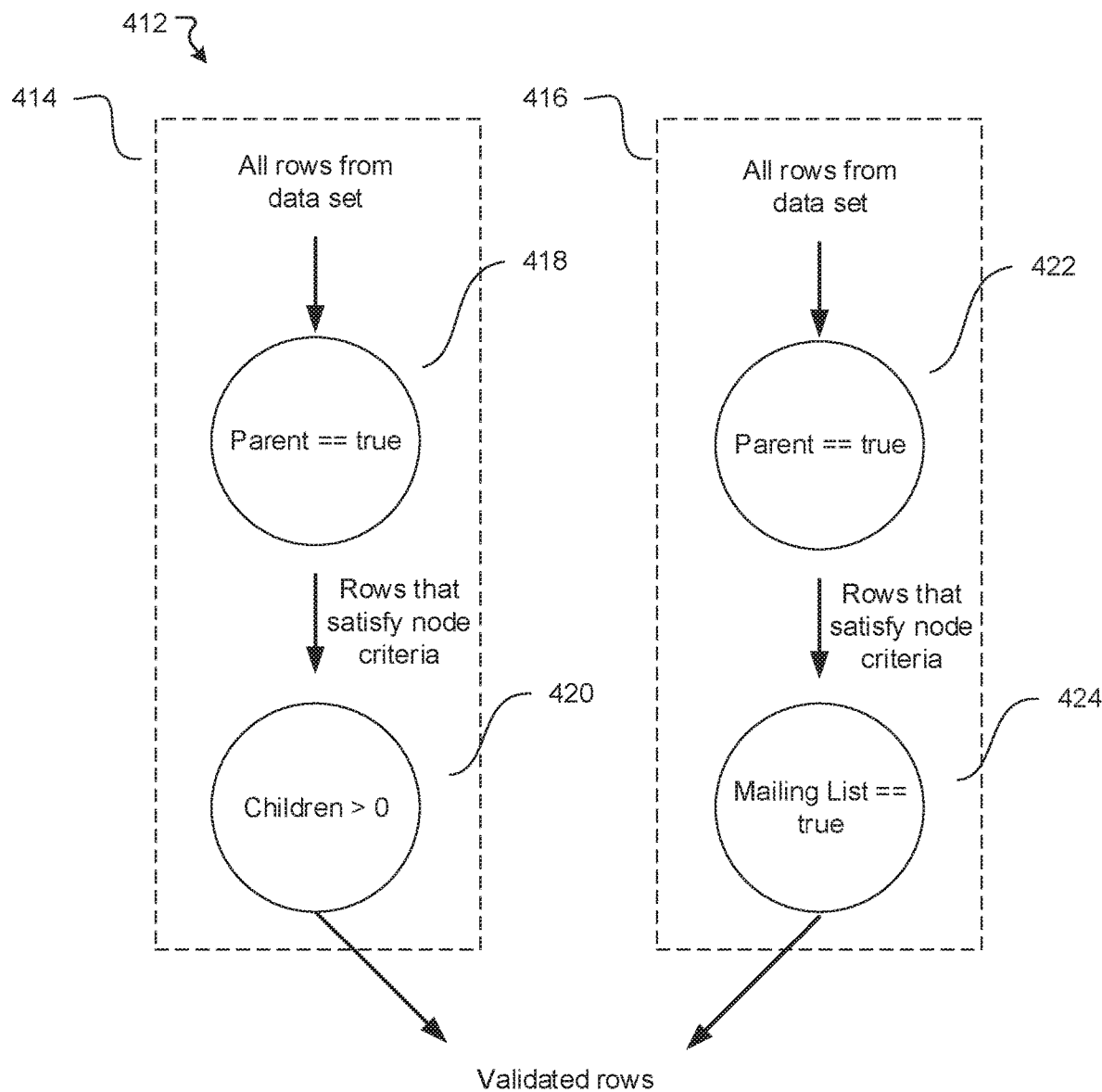

In some instances, a validation expression may include one or more Boolean operations (e.g., AND operation, OR operation, XOR operation, NOT operation, etc.). In various embodiments, nodes of a graph-based evaluation framework can be structured to accommodate such Boolean operations. For example, a database table may include a "parent" column that indicates whether an individual is a parent, a "number of children" column that provides a count of the individual's children, and a "mailing list" column that indicates whether the individual is included in a mailing list. In this example, a validation expression for the database table may include an AND operation to ensure that rows having a corresponding "parent" column value that is set to true (i.e., the individual is a parent) have a corresponding "number of children" column value that is greater than zero (i.e., number of children is greater than zero) and also have a corresponding "mailing list" column value that is set to true (i.e., the individual is included in the mailing list). In some embodiments, when abstracting this validation expression as a graph, the graph engine 206 can create a first connected component that includes a first node (e.g., a source node) and a second node (e.g., a sink node) and a second connected component that also includes a first node (e.g., source node) and a second node (e.g., sink node), as illustrated in the example of FIG. 4B. In this example, the first node of the first connected component can identify rows that have a "parent" column value set to true. Any rows that satisfy this criterion can then be passed to the second node of the first connected component for processing. Any rows that do not satisfy this criterion can be identified as rows that failed the validation job. The second node of the first connected component can be configured to identify rows having a "number of children" column value that is greater than zero. Similarly, the first node of the second connected component can identify rows that have a "parent" column value set to true. Any rows that satisfy this criterion can then be passed to the second node of the second connected component for processing. Any rows that do not satisfy this criterion can be identified as rows that failed the validation job. The second node of the second connected component can be configured to identify rows having a "mailing list" column value that is set to true. In this example, rows that satisfy validation criteria associated with both the second node of the first connected component and the second node of the second connected component are deemed to be validated.

Figure 4C:
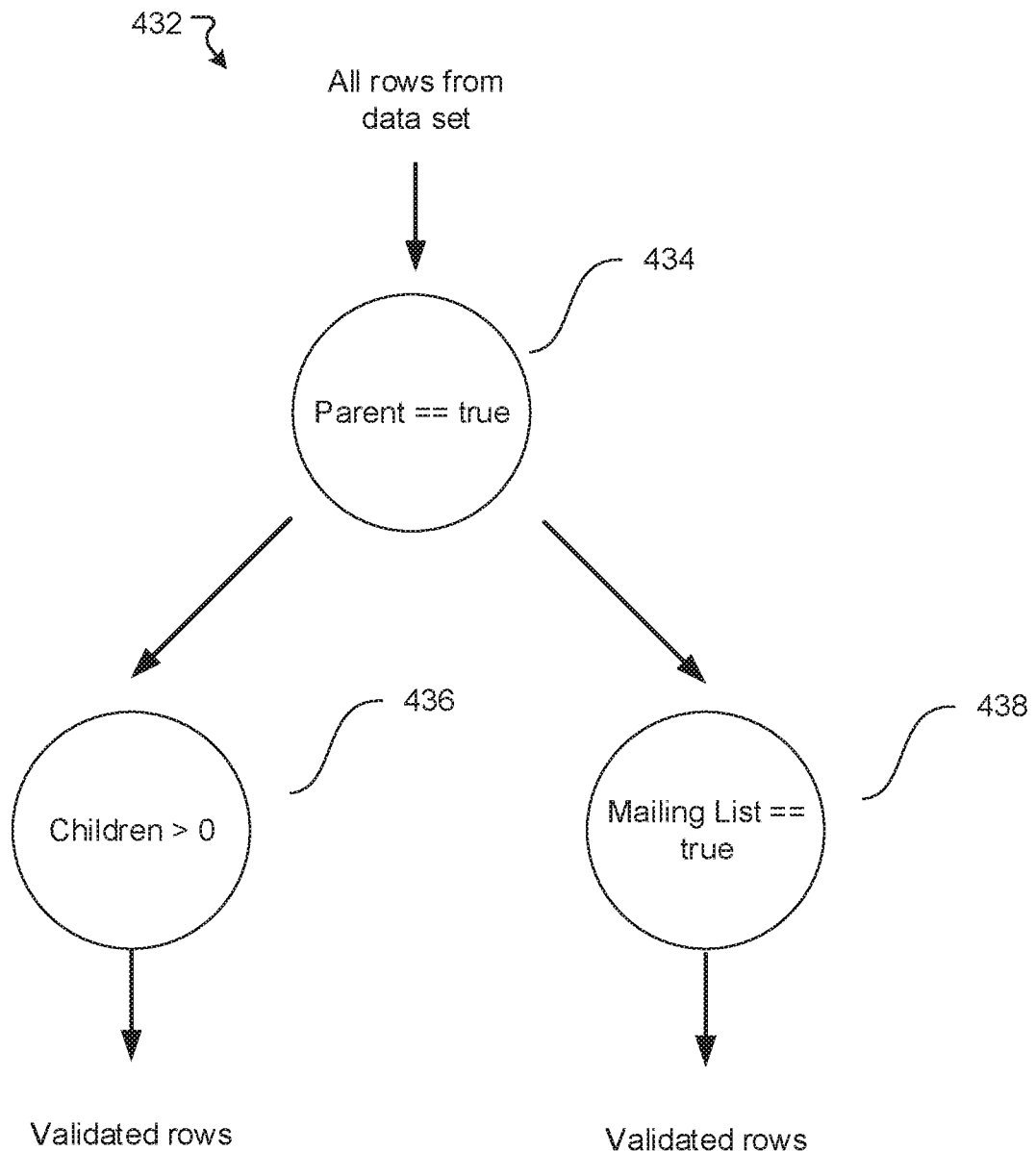

In another example, a validation expression for a database table may include an OR operation to ensure that rows having a corresponding "parent" column value that is set to true (i.e., the individual is a parent) have a corresponding "number of children" column value that is greater than zero (i.e., number of children is greater than zero) or have a corresponding "mailing list" column value that is set to true (i.e., the individual is included in the mailing list). In some embodiments, when abstracting this validation expression as a graph, the graph engine 206 can create a connected component that includes a first node (e.g., a source node) connected to a second node (e.g., a sink node) and a third node (e.g., sink node), as illustrated in the example of FIG. 4C. In this example, the first node can identify rows that have a "parent" column value set to true. Any rows that satisfy this criterion can then be passed to the second node and the third node for further processing. Any rows that do not satisfy this criterion can be identified as rows that failed the validation job. The second node can be associated with a validation expression which identifies rows having a "number of children" column value that is greater than zero. The third node can be associated with a validation expression which identifies rows having a "mailing list" column value that is set to true. In some embodiments, rows that satisfy validation expressions associated with either the second node or the third node are deemed validated.

These graph-based evaluation frameworks are provided merely as examples. Naturally, graph-based evaluation frameworks generated by the graph engine 206 can include any number of connected components that are structured to represent any type of validation criteria regardless of whether such criteria involves simple or complex validation expressions and any nested validation expressions.

The output engine 208 can be configured to output information describing results of a validation job. For example, in some embodiments, the output engine 208 can determine which portions of a given data set satisfied validation criterion associated with a given node in a graph-based evaluation framework and which portions of the data set did not satisfy validation criterion associated with a given node in the graph-based evaluation framework. The output engine 208 can provide this validation information for review through an interface, for example. For example, the output engine 208 can generate a report identifying which rows of a database table were validated successfully and which rows of the database table did not validate successfully. For those rows that did not validate successfully, the report can identify validation expressions (and corresponding nodes with which those validation expressions are associated) that the rows did not satisfy. In some embodiments, the interface can provide options for performing various actions to rows that did not validate successfully.

One example option can include modifying (or reformatting) values corresponding to those rows.

Figure 3:
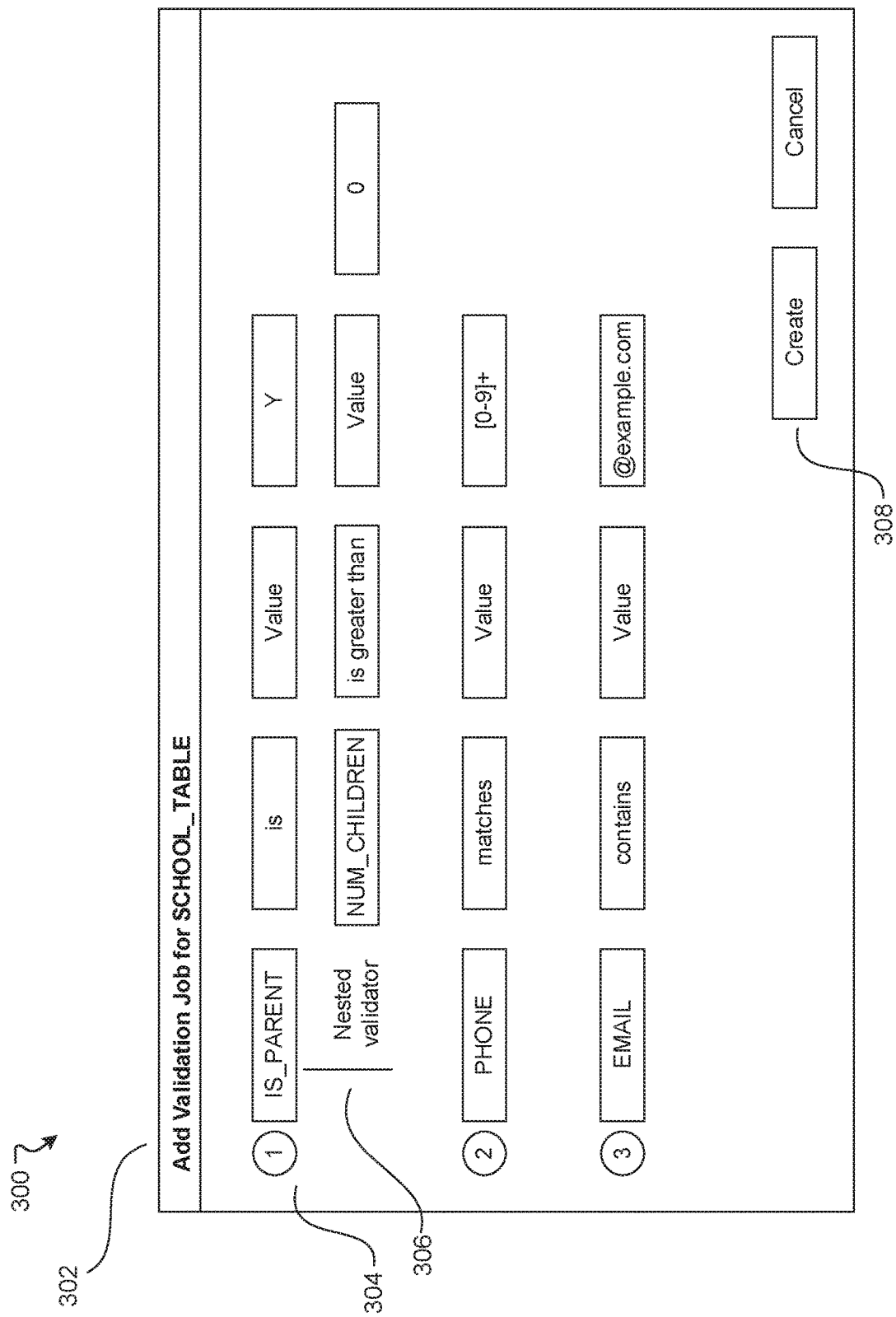
FIG. 3 illustrates a diagram of an example interface, in accordance with various embodiments.

FIG. 3 illustrates a diagram of an example 300 of an interface 302. In general, some, or all, of the features described in reference to FIG. 3 can be implemented and provided by the interface engine 108 of FIG. 1. In various embodiments, the interface 302 may be accessed through a software application (e.g., data validation application, web browser, etc.) running on a computing device. In some embodiments, the interface 302 can be used to create validation criteria for validating various data. For example, the interface 302 can be used to specify a database table from which data is to be validated. In some embodiments, a schema (e.g., column names) corresponding to the database table being validated can be determined and used to populate fields in the interface 302. In the example of FIG. 3, validation criteria 304 for validating the data can be defined by selecting columns from down-down menus and defining some criteria for validating values corresponding to those columns. For example, the validation criteria 304 specifies that a value corresponding to a column "IS_PARENT" is set to "Y". In some embodiments, the interface 302 includes options for defining nested validation criteria. For example, in FIG. 3, a nested validation criteria 306 is specified for the validation criteria 304. In this example, the nested validation criteria 306 specifies that a value corresponding to a column "NUM_CHILDREN" is greater than zero. Once the validation criteria is defined, an option 308 can be selected to generate a corresponding graph-based evaluation framework (or graph) that represents the specified validation criteria. The graph can include a number of nodes that are each associated with corresponding validation expressions. These nodes can be structured to validate data based on the specified validation criteria, as illustrated in the examples of FIGS. 4A-4D. In general, any well-known approach for validating data can be used to create such validation criteria. For example, validation criteria can involve determining whether a string in one column matches a string in another column. In another example, validation criteria can involve determining whether a value corresponding to a given column satisfies a specified regular expression. In some instances, the validation criteria may involve comparisons between values corresponding to columns. These comparisons may be numerical comparisons, time-based comparisons (e.g., before or after a specified date or between dates), and string-based comparisons. Naturally, many variations are possible.

FIG. 4A illustrates a diagram of an example connected component 402 of a graph-based evaluation framework. The connected component 402 includes a first node (e.g., a source node) 404 and a second node (e.g., a sink node) 406. In this example, the connected component 402 was generated to represent validation criteria ensuring that rows of a database table having a corresponding "parent" column value that is set to true (i.e., the individual is a parent) also have a corresponding "number of children" column value that is greater than zero (i.e., number of children is greater than zero). As illustrated, the first node 404 is associated with a validation expression which ensures that rows have a "parent" column value set to true. Any rows that satisfy this criterion can then be passed to the second node 406 for processing. Further, any rows that do not satisfy this criterion can be identified as rows that failed the validation job. The second node 406 is associated with a validation expression which ensures that rows provided by the first node 404 have a "number of children" column value that is greater than zero. In some embodiments, rows that satisfy this criterion are deemed validated. In some embodiments, rows that do not satisfy this criterion can be identified as rows that failed the validation job.

FIG. 4B illustrates a diagram of an example graph-based evaluation framework 412 representing an AND operation. The graph-based evaluation framework 412 includes a first connected component 414 which includes a first node (e.g., a source node) 418 and a second node (e.g., a sink node) 420 and a second connected component 416 which includes a first node (e.g., a source node) 422 and a second node (e.g., a sink node) 424. In this example, the graph-based evaluation framework 412 was generated to represent validation criteria ensuring that rows of a database table having a corresponding "parent" column value that is set to true (i.e., the individual is a parent) also have a corresponding "number of children" column value that is greater than zero (i.e., number of children is greater than zero) and a "mailing list" column value that is set to true. In this example, the first node 418 of the first connected component 414 can identify rows that have a "parent" column value set to true. Any rows that satisfy this criterion can then be passed to the second node 420 of the first connected component 414 for processing. Any rows that do not satisfy this criterion can be identified as rows that failed the validation job. The second node 420 of the first connected component 414 can be configured to identify rows having a "number of children" column value that is greater than zero. Similarly, the first node 422 of the second connected component 416 can identify rows that have a "parent" column value set to true. Any rows that satisfy this criterion can then be passed to the second node 424 of the second connected component 416 for processing. Any rows that do not satisfy this criterion can be identified as rows that failed the validation job. The second node 424 of the second connected component 416 can be configured to identify rows having a "mailing list" column value that is set to true. In this example, rows that satisfy validation criteria associated with both the second node 420 of the first connected component 414 and the second node 424 of the second connected component 416 are deemed to be validated.

FIG. 4C illustrates a diagram of an example graph-based evaluation framework 432 representing an OR operation. For example, a validation expression for a database table may include an OR operation to ensure that rows having a corresponding "parent" column value that is set to true (i.e., the individual is a parent) have a corresponding "number of children" column value that is greater than zero (i.e., number of children is greater than zero) or have a corresponding "mailing list" column value that is set to true (i.e., the individual is included in the mailing list). The graph-based evaluation framework 432 can be constructed to represent this validation criteria using one connected component which includes a first node (e.g., a source node) 434 connected to a second node (e.g., a sink node) 436 and a third node (e.g., sink node) 438. In this example, the first node 434 can be associated with a validation expression for identifying rows that have a "parent" column value set to true. Any rows that satisfy this criterion can then be passed to the second node 436 and the third node 438 for further processing. Any rows that do not satisfy this criterion can be identified as rows that failed the validation job. The second node 436 can be associated with a validation expression which identifies rows having a "number of children" column value that is greater than zero. The third node 438 can be associated with a validation expression which identifies rows having a "mailing list" column value that is set to true. In some embodiments, rows that satisfy validation expressions associated with either the second node 436 or the third node 438 are deemed validated.

Figure 4D:
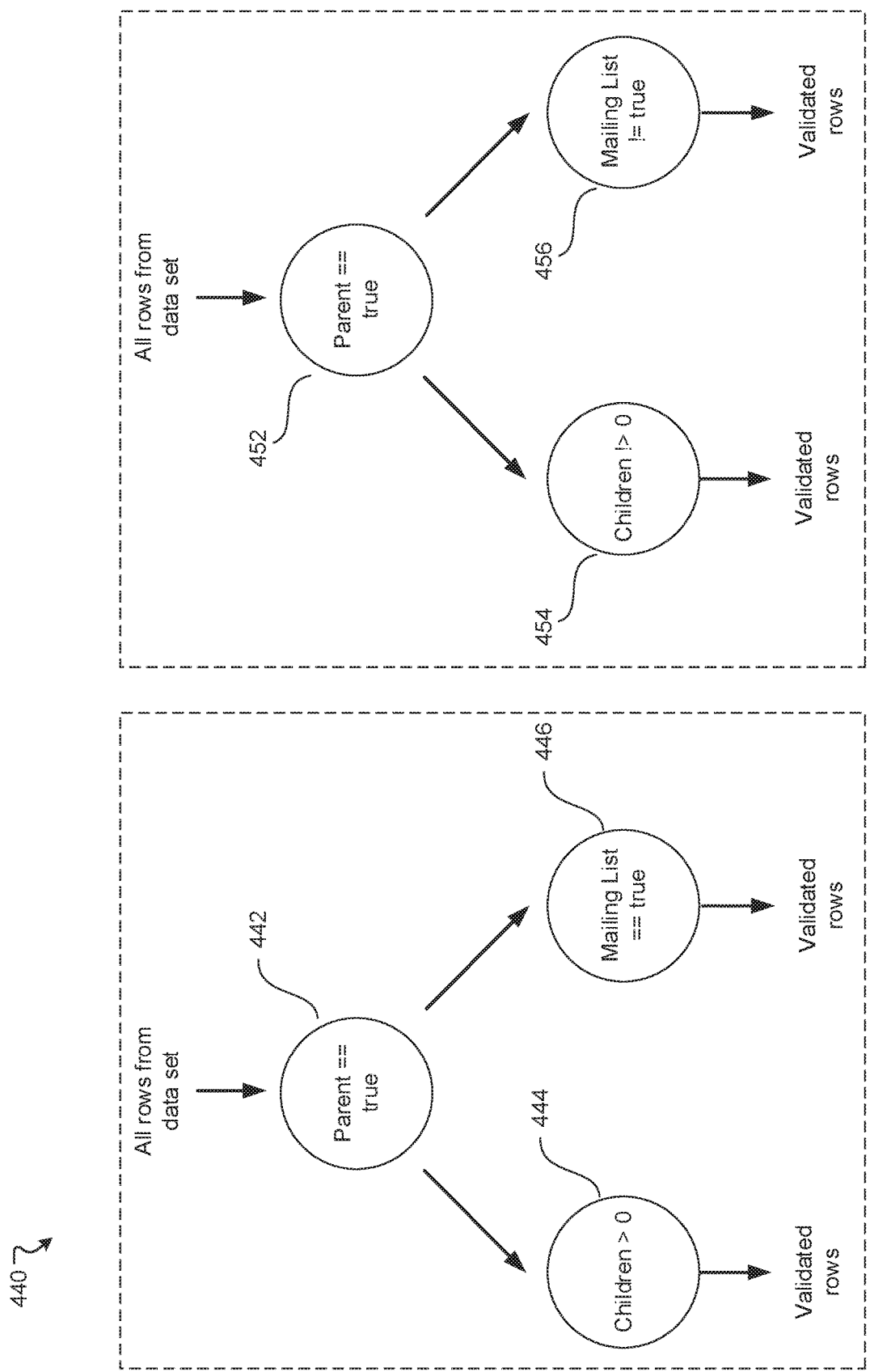

FIG. 4D illustrates a diagram of an example graph-based evaluation framework 440 representing an XOR (or exclusive OR) operation. For example, a validation expression for a database table may include an XOR operation to ensure that rows having a corresponding "parent" column value that is set to true (i.e., the individual is a parent) either have a corresponding "number of children" column value that is greater than zero (i.e., number of children is greater than zero) or have a corresponding "mailing list" column value that is set to true (i.e., the individual is included in the mailing list), but not both. The graph-based evaluation framework 440 can be constructed to represent this validation criteria using a first connected component which includes a first node (e.g., a source node) 442 connected to a second node (e.g., a sink node) 444 and a third node (e.g., sink node) 446 and a second connected component which includes a first node (e.g., a source node) 452 connected to a second node (e.g., a sink node) 454 and a third node (e.g., sink node) 456.

In this example, the first node 442 of the first connected component can be associated with a validation expression for identifying rows that have a "parent" column value set to true. Any rows that satisfy this criterion can then be passed to the second node 444 and the third node 446 for further processing. Any rows that do not satisfy this criterion can be identified as rows that failed the validation job. The second node 444 can be associated with a validation expression which identifies rows having a "number of children" column value that is greater than zero. The third node 446 can be associated with a validation expression which identifies rows having a "mailing list" column value that is set to true. Similarly, the first node 452 of the second connected component can be associated with a validation expression for identifying rows that have a "parent" column value set to true. Any rows that satisfy this criterion can then be passed to the second node 454 and the third node 456 for further processing. Any rows that do not satisfy this criterion can be identified as rows that failed the validation job. The second node 454 can be associated with a validation expression which identifies rows having a "number of children" column value that is not greater than zero. The third node 456 can be associated with a validation expression which identifies rows having a "mailing list" column value that is not set to true. In some embodiments, rows that satisfy validation expressions associated with either the second node 444 or the third node 446 and that satisfy validation expressions with either the second node 454 and the third node 456 are deemed validated.

In various embodiments, graph-based evaluation frameworks can be analyzed using well-known graph optimization algorithms (e.g., minimum-cost analysis, shortest path, etc.). For example, a minimum-flow algorithm can be applied to a graph-based evaluation framework to determine whether connected components included in the framework fail or succeed. In some embodiments, the edges of nodes in the connected components can be weighted based on the number of rows of a given data set that are passed between those nodes. This analysis can help identify the least number of validations that need to be performed for a given connected component to succeed.

Figure 5:
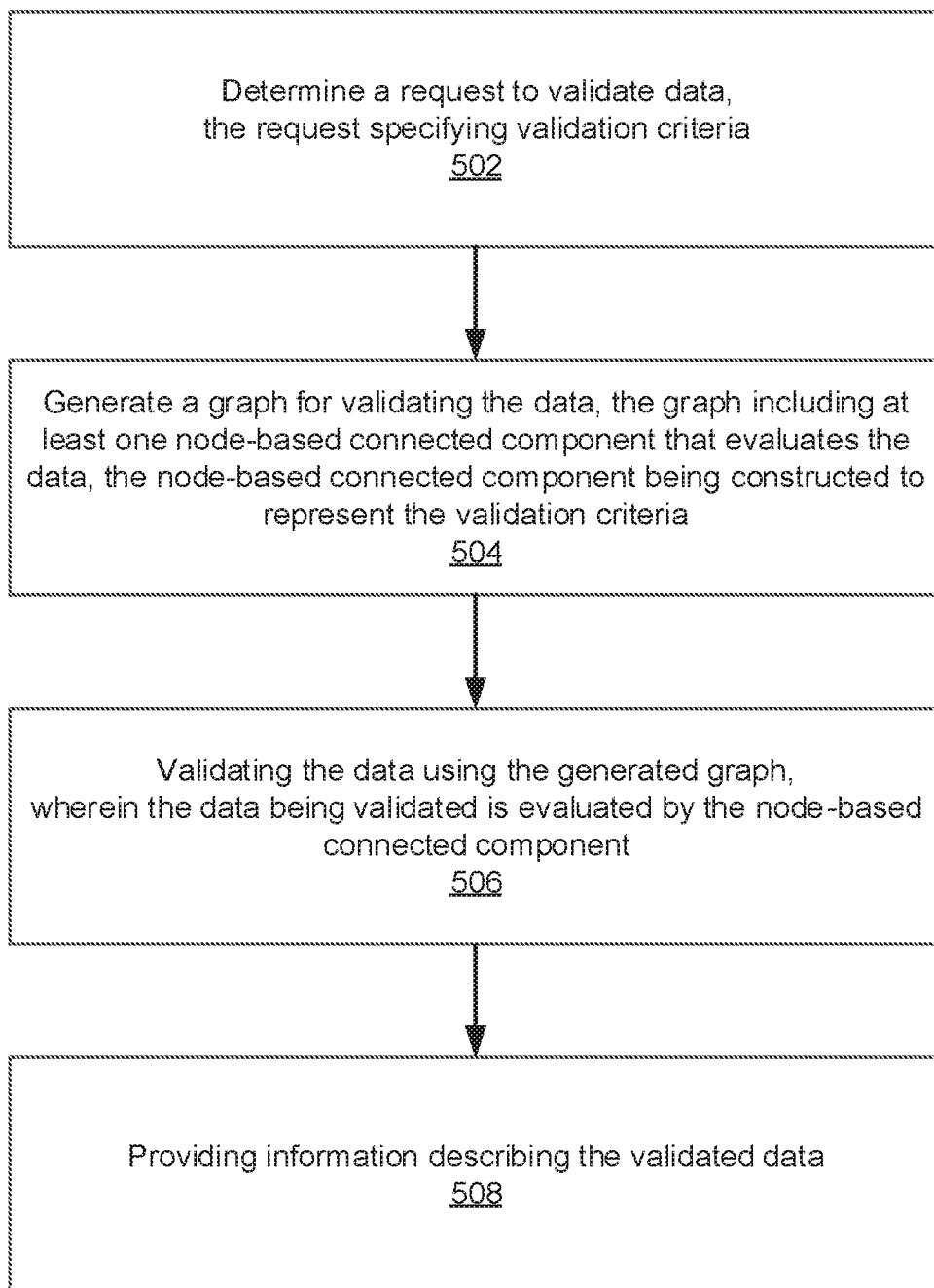
FIG. 5 illustrates a flowchart of an example method, in accordance with various embodiments.

FIG. 5 illustrates a flowchart of an example method 500, according to various embodiments of the present disclosure. The method 500 may be implemented in various environments including, for example, the environment 100 of FIG. 1. The operations of method 500 presented below are intended to be illustrative. Depending on the implementation, the example method 500 may include additional, fewer, or alternative steps performed in various orders or in parallel. The example method 500 may be implemented in various computing systems or devices including one or more processors.

At block 502, a request to validate data is determined. The request can specify validation criteria. At block 504, a graph for validating the data can be generated. The graph can include at least one node-based connected component that evaluates the data. The node-based connected component can be constructed to represent the validation criteria. At block 506, the data can be validated using the generated graph. The data being validated can be evaluated by the node-based component. At block 508, information describing the validated data can be provided, for example, through an interface.

Hardware Implementation

The techniques described herein are implemented by one or more special-purpose computing devices. The special-purpose computing devices may be hard-wired to perform the techniques, or may include circuitry or digital electronic devices such as one or more application-specific integrated circuits (ASICs) or field programmable gate arrays (FPGAs) that are persistently programmed to perform the techniques, or may include one or more hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

Computing device(s) are generally controlled and coordinated by operating system software, such as iOS, Android, Chrome OS, Windows XP, Windows Vista, Windows 7, Windows 8, Windows Server, Windows CE, Unix, Linux, SunOS, Solaris, iOS, Blackberry OS, VxWorks, or other compatible operating systems. In other embodiments, the computing device may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 6:
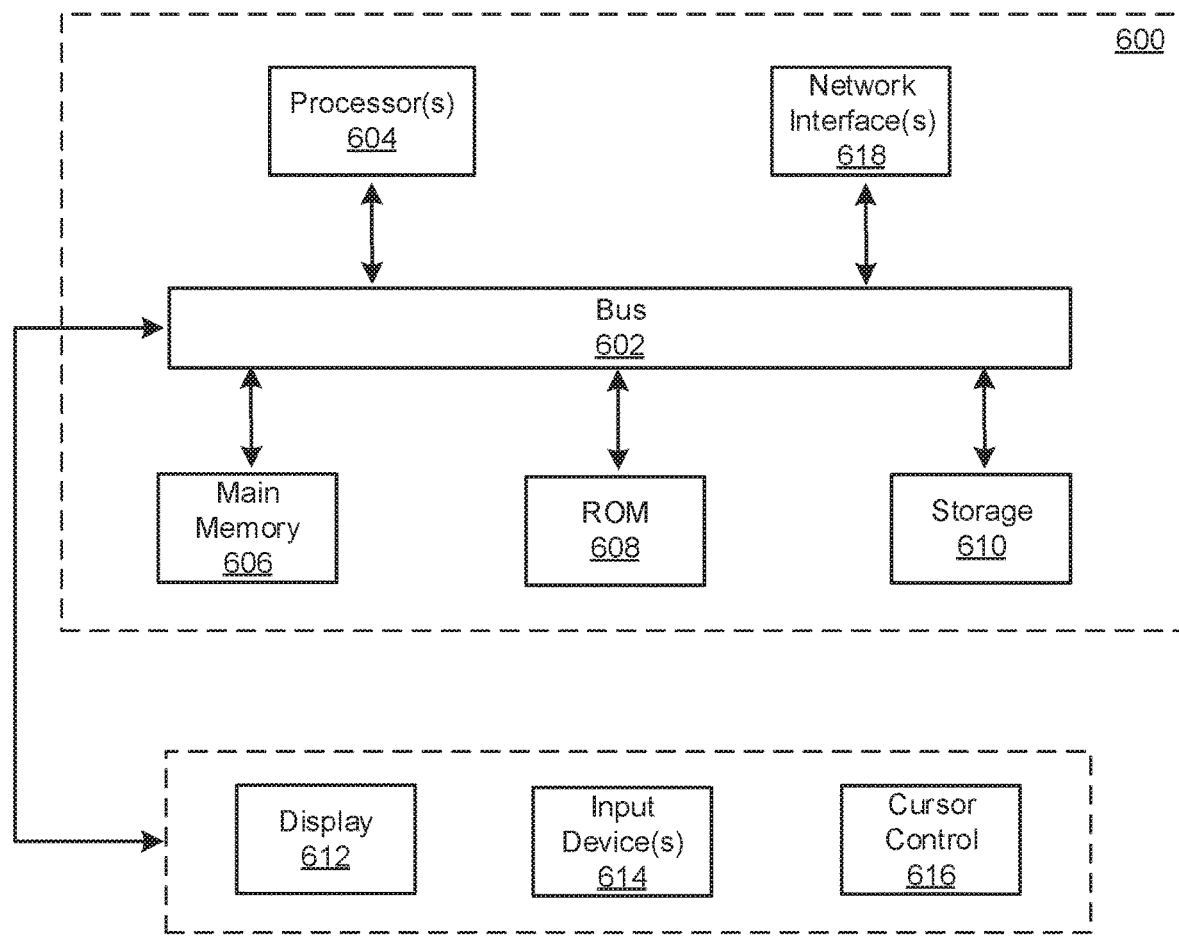
FIG. 6 illustrates a block diagram of an example computer system in which any of the embodiments described herein may be implemented.

FIG. 6 is a block diagram that illustrates a computer system 600 upon which any of the embodiments described herein may be implemented. The computer system 600 includes a bus 602 or other communication mechanism for communicating information, one or more hardware processors 604 coupled with bus 602 for processing information. Hardware processor(s) 604 may be, for example, one or more general purpose microprocessors.

The computer system 600 also includes a main memory 606, such as a random access memory (RAM), cache and/or other dynamic storage devices, coupled to bus 602 for storing information and instructions to be executed by processor 604. Main memory 606 also may be used for storing temporary variables or other intermediate information during execution of instructions to be executed by processor 604. Such instructions, when stored in storage media accessible to processor 604, render computer system 600 into a special-purpose machine that is customized to perform the operations specified in the instructions.

The computer system 600 further includes a read only memory (ROM) 608 or other static storage device coupled to bus 602 for storing static information and instructions for processor 604. A storage device 610, such as a magnetic disk, optical disk, or USB thumb drive (Flash drive), etc., is provided and coupled to bus 602 for storing information and instructions.

The computer system 600 may be coupled via bus 602 to a display 612, such as a cathode ray tube (CRT) or LCD display (or touch screen), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

The computing system 600 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage.

The computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor(s) 604 executing one or more sequences of one or more instructions contained in main memory 606. Such instructions may be read into main memory 606 from another storage medium, such as storage device 610. Execution of the sequences of instructions contained in main memory 606 causes processor(s) 604 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 610. Volatile media includes dynamic memory, such as main memory 606. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may retrieves and executes the instructions. The instructions received by main memory 606 may optionally be stored on storage device 610 either before or after execution by processor 604.

The computer system 600 also includes a communication interface 618 coupled to bus 602. Communication interface 618 provides a two-way data communication coupling to one or more network links that are connected to one or more local networks. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN (or WAN component to communicated with a WAN). Wireless links may also be implemented. In any such implementation, communication interface 618 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet". Local network and Internet both use electrical, electromagnetic or optical signals that carry digital data streams. The signals through the various networks and the signals on network link and through communication interface 618, which carry the digital data to and from computer system 600, are example forms of transmission media.

The computer system 600 can send messages and receive data, including program code, through the network(s), network link and communication interface 618. In the Internet example, a server might transmit a requested code for an application program through the Internet, the ISP, the local network and the communication interface 618.

The received code may be executed by processor 604 as it is received, and/or stored in storage device 610, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

ENGINES, COMPONENTS, AND LOGIC

Certain embodiments are described herein as including logic or a number of components, engines, or mechanisms. Engines may constitute either software engines (e.g., code embodied on a machine-readable medium) or hardware engines. A "hardware engine" is a tangible unit capable of performing certain operations and may be configured or arranged in a certain physical manner. In various example embodiments, one or more computer systems (e.g., a standalone computer system, a client computer system, or a server computer system) or one or more hardware engines of a computer system (e.g., a processor or a group of processors) may be configured by software (e.g., an application or application portion) as a hardware engine that operates to perform certain operations as described herein.

In some embodiments, a hardware engine may be implemented mechanically, electronically, or any suitable combination thereof. For example, a hardware engine may include dedicated circuitry or logic that is permanently configured to perform certain operations. For example, a hardware engine may be a special-purpose processor, such as a Field-Programmable Gate Array (FPGA) or an Application Specific Integrated Circuit (ASIC). A hardware engine may also include programmable logic or circuitry that is temporarily configured by software to perform certain operations. For example, a hardware engine may include software executed by a general-purpose processor or other programmable processor. Once configured by such software, hardware engines become specific machines (or specific components of a machine) uniquely tailored to perform the configured functions and are no longer general-purpose processors. It will be appreciated that the decision to implement a hardware engine mechanically, in dedicated and permanently configured circuitry, or in temporarily configured circuitry (e.g., configured by software) may be driven by cost and time considerations.

Accordingly, the phrase "hardware engine" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented engine" refers to a hardware engine. Considering embodiments in which hardware engines are temporarily configured (e.g., programmed), each of the hardware engines need not be configured or instantiated at any one instance in time. For example, where a hardware engine comprises a general-purpose processor configured by software to become a special-purpose processor, the general-purpose processor may be configured as respectively different special-purpose processors (e.g., comprising different hardware engines) at different times. Software accordingly configures a particular processor or processors, for example, to constitute a particular hardware engine at one instance of time and to constitute a different hardware engine at a different instance of time.

Hardware engines can provide information to, and receive information from, other hardware engines. Accordingly, the described hardware engines may be regarded as being communicatively coupled. Where multiple hardware engines exist contemporaneously, communications may be achieved through signal transmission (e.g., over appropriate circuits and buses) between or among two or more of the hardware engines. In embodiments in which multiple hardware engines are configured or instantiated at different times, communications between such hardware engines may be achieved, for example, through the storage and retrieval of information in memory structures to which the multiple hardware engines have access. For example, one hardware engine may perform an operation and store the output of that operation in a memory device to which it is communicatively coupled. A further hardware engine may then, at a later time, access the memory device to retrieve and process the stored output. Hardware engines may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein. As used herein, "processor-implemented engine" refers to a hardware engine implemented using one or more processors.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet)

and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

It will be appreciated that an "engine," "system," "data store," and/or "database" may comprise software, hardware, firmware, and/or circuitry. In one example, one or more software programs comprising instructions capable of being executable by a processor may perform one or more of the functions of the engines, data stores, databases, or systems described herein. In another example, circuitry may perform the same or similar functions. Alternative embodiments may comprise more, less, or functionally equivalent engines, systems, data stores, or databases, and still be within the scope of present embodiments. For example, the functionality of the various systems, engines, data stores, and/or databases may be combined or divided differently.

"Open source" software is defined herein to be source code that allows distribution as source code as well as compiled form, with a well-publicized and indexed means of obtaining the source, optionally with a license that allows modifications and derived works.

The data stores described herein may be any suitable structure (e.g., an active database, a relational database, a self-referential database, a table, a matrix, an array, a flat file, a documented-oriented storage system, a non-relational NoSQL system, and the like), and may be cloud-based or otherwise.

As used herein, the term "or" may be construed in either an inclusive or exclusive sense. Moreover, plural instances may be provided for resources, operations, or structures described herein as a single instance. Additionally, boundaries between various resources, operations, engines, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Although the invention has been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

The invention claimed is:

1. A system comprising:
one or more processors; and
a memory storing instructions that, when executed by the one or more processors, cause the system to perform:
receiving a request to validate data of a dataset, wherein the request specifies a series of validation criteria comprising a first validation criteria and a second validation criteria;
constructing a framework to validate the data, wherein the framework comprises a first node associated with the first validation criteria and a second node associated with the second validation criteria, and one or more edges between the first node and the second node;
validating the data according to the framework wherein the validating comprises:
determining any first portion of the data satisfying the first validation criteria and the second validation criteria and any second portion of the data failing to satisfy the first validation criteria or the second validation criteria;

weighting the one or more edges based on a number of rows of the dataset passed from the first node to the second node; and selecting a validation mechanism based on the weighting of the one or more edges; and providing information regarding the validating of the data, wherein the providing of the information comprises providing an option to modify one or more values corresponding to the any second portion of the data.

2. The system of claim 1, wherein the first validation criteria or the second validation criteria comprises validation expressions to be applied to the data, wherein the validation expressions are defined through a user interface.

3. The system of claim 1, wherein the validation of the data further includes evaluating the data and outputting a Boolean value to indicate whether the first validation criteria has been met.

4. The system of claim 1, wherein the validation of the data further includes:

determining a first subset of the data satisfying the first validation criteria; and determining a second subset of the data, from the first subset of the data, that also satisfies the second validation criteria as comprised within the any first portion.

5. The system of claim 4, wherein the second subset of the data is determined in response to a Boolean expression resulting from the determination of the first subset of the data, the Boolean expression indicating that the first subset of the data satisfies the first validation criteria.

6. The system of claim 1, wherein the data includes a set of rows in the dataset; and the validation of the data includes:

determining a first subset of the rows satisfying the first validation criteria; and determining, from the first subset, a third subset of the rows failing to satisfy the second validation criteria as comprised within the any second portion.

7. A computer-implemented method, the method comprising:

receiving a request to validate data of a dataset, wherein the request specifies a series of validation criteria comprising a first validation criteria and a second validation criteria;

constructing a framework to validate the data, wherein the framework comprises a first node associated with the first validation criteria and a second node associated with the second validation criteria, and one or more edges between the first node and the second node;

validating the data according to the framework wherein the validating comprises:

determining any first portion of the data satisfying the first validation criteria and the second validation criteria and any second portion of the data failing to satisfy the first validation criteria or the second validation criteria;

weighting the one or more edges based on a number of rows of the dataset passed from the first node to the second node; and selecting a validation mechanism based on the weighting of the one or more edges; and providing information regarding the validating of the data, wherein the providing of the information comprises providing an option to modify one or more values corresponding to the any second portion of the data.

8. The computer-implemented method of claim 7, wherein the first validation criteria or the second validation criteria comprises validation expressions to be applied to the data, wherein the validation expressions are defined through a user interface.

9. The computer-implemented method of claim 7, wherein the validation of the data further includes evaluating the data and outputting a Boolean value to indicate whether the first validation criteria has been met.

10. The computer-implemented method of claim 7, wherein the validation of the data further includes:

determining a first subset of the data satisfying the first validation criteria; and determining a second subset of the data, from the first subset of the data, that also satisfies the second validation criteria as comprised within the any first portion.

11. The computer-implemented method of claim 7, wherein the data includes a set of rows in the dataset; and the validation of the data includes:

a first subset of the rows satisfying the first validation criteria; and determining, from the first subset, a third subset of the rows failing to satisfy the second validation criteria as comprised within the any second portion.

12. A non-transitory computer readable medium comprising instructions that, when executed, cause one or more processors to perform:

receiving a request to validate data of a dataset, wherein the request specifies a series of validation criteria comprising a first validation criteria and a second validation criteria;

constructing a framework to validate the data, wherein the framework comprises a first node associated with the first validation criteria and a second node associated with the second validation criteria, and one or more edges between the first node and the second node;

validating the data according to the framework, wherein the validating comprises determining any first portion of the data satisfying the first validation criteria and the second validation criteria and any second portion of the data failing to satisfy the first validation criteria or the second validation criteria;

weighting the one or more edges based on a number of rows of the dataset passed from the first node to the second node; and selecting a validation mechanism based on the weighting of the one or more edges; and providing information regarding the validating of the data, wherein the providing of the information comprises providing an option to modify one or more values corresponding to the any second portion of the data.

13. The non-transitory computer readable medium of claim 12, wherein the validation of the data further includes evaluating the data and outputting a Boolean value to indicate whether the first validation criteria has been met.

14. The non-transitory computer readable medium of claim 12, wherein the data includes a set of rows in the dataset; and the validation of the data includes:

determining a first subset of the rows satisfying the first validation criteria; and determining, from the first subset, a third subset of the rows failing to satisfy the second validation criteria as comprised within the any second portion.

15. The system of claim 1, wherein the first validation criteria comprises a comparison of a first column or a first row of the data against a qualitative, non-numerical expression and the second validation criteria comprises a comparison of a second column or a second row of the data against a numerical expression.

16. The system of claim 1, wherein the first validation criteria and the second validation criteria are evaluated against different columns or rows.

17. The system of claim 1, wherein the providing of the information comprises providing an indication of a validation expression that resulted in the failure of the validation for the any second portion of the data.

18. The system of claim 1, wherein the second validation criteria comprises two conditions such that:
    if one of the two conditions is satisfied, then the second validation criteria is satisfied, and
    if both of or none of the two conditions are satisfied, then the second validation criteria is unmet.

19. The system of claim 1, wherein the selecting of the validation mechanism comprises selecting a particular validation mechanism corresponding to a lowest weighting of the one or more edges.

20. The system of claim 1, wherein the first node comprises a source node and the second node comprises a sink node.

\* \* \* \* \*